US012789698B2

(12) United States Patent
Zeuner

(10) Patent No.: US 12,789,698 B2
(45) Date of Patent: Nov. 10, 2026

(54) VEHICLE EXTERIOR SYSTEM

(71) Applicant: ZKW Group GmbH, Wieselburg (AT)

(72) Inventor: Markus Zeuner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/365,679

(22) Filed: Oct. 22, 2025

(65) Prior Publication Data

US 2026/0138522 A1 May 21, 2026

(30) Foreign Application Priority Data

Nov. 19, 2024 (EP) .................................... 24213845

(51) Int. Cl.
*B60Q 1/04* (2006.01)
*B60Q 1/00* (2006.01)
*B60R 19/02* (2006.01)

(52) U.S. Cl.
CPC ......... *B60Q 1/0483* (2013.01); *B60Q 1/0094* (2013.01); *B60R 19/02* (2013.01)

(58) Field of Classification Search
CPC .. B60Q 1/0041; B60Q 1/2638; B60Q 1/2653; B60Q 1/04
See application file for complete search history.

(56) References Cited

U.S. PATENT DOCUMENTS 5,709,453 A * 1/1998 Krent .................... F21S 43/247 362/100
7,837,368 B2 * 11/2010 Nakamura ........... B60Q 1/0041 362/544

FOREIGN PATENT DOCUMENTS

| | | | |
|---|---|---|---|
| CN | 112172723 | A | 1/2021 |
| CN | 216580316 | U | 5/2022 |
| DE | 102011051686 | A1 | 1/2013 |
| JP | 2007237892 | A | 9/2007 |
| KR | 20220010227 | A | 1/2022 |

* cited by examiner

*Primary Examiner* — William J Carter
(74) *Attorney, Agent, or Firm* — Eversheds Sutherland (US) LLP

(57) ABSTRACT

The invention relates to a vehicle exterior system (1) comprising: a bumper (2), a lamp (7) and a rigid bracket (14). The bracket (14) is designed to form an enclosure (20), which is enclosed by the bumper (2), the bracket (14) and a seal (18) between the bracket (14) and the bumper (2). At least one illumination element (22) is arranged in the enclosure and configured to emit light (23), which is transmittable through transparent sections (6) in the bumper (2).

5 Claims, 1 Drawing Sheet

VEHICLE EXTERIOR SYSTEM

Figure 1:
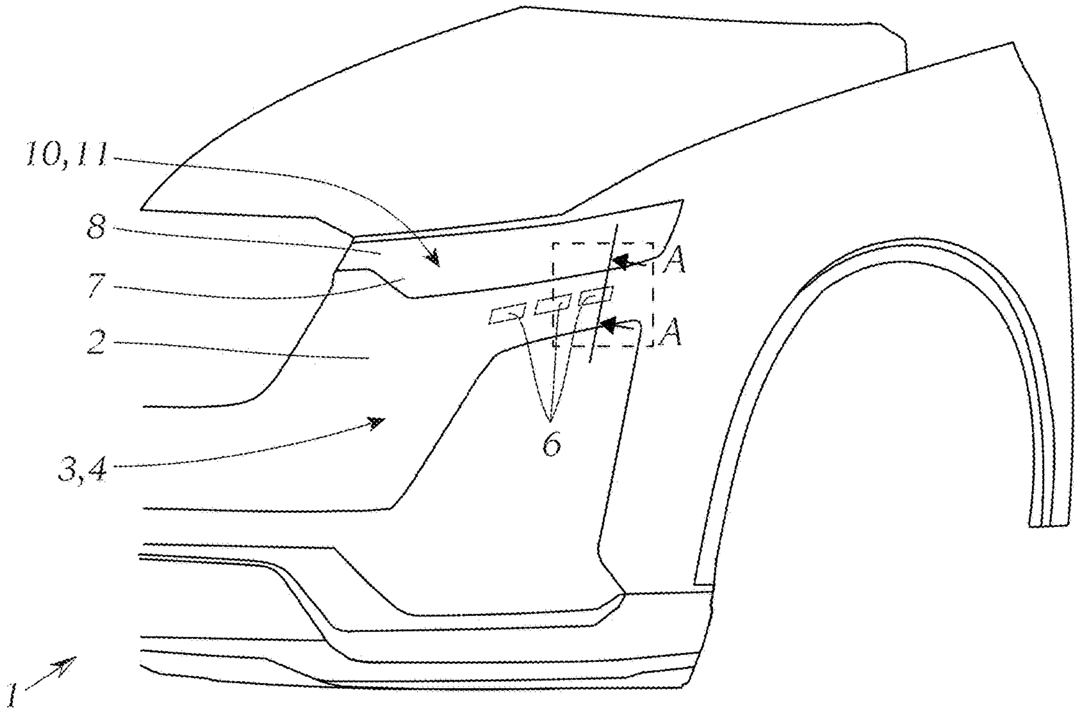

The invention relates to a vehicle exterior system comprising: a bumper, a lamp and a rigid bracket, wherein the bumper comprises an outer surface and an inner surface opposite to the outer surface, the outer surface forms a first exterior section of the vehicle exterior system, wherein the lamp comprises a cover lens and a housing, the cover lens comprises a first outer lens section which forms a second exterior section of the vehicle exterior system, the cover lens further comprises a second outer lens section which overlaps with the bumper such that the inner surface is partly directed to the second outer lens section and such that the first exterior section and the second exterior section are adjacent to each other, wherein the bracket comprises a front surface and a rear surface opposite to the front surface, the bracket is positioned between the lamp and the bumper such that the front surface faces partly the inner surface and the rear surface faces partly the second outer lens section.

Such vehicle exterior systems are widely used, especially in motor vehicles. The interaction between a bumper and a lamp of a vehicle is essential for the vehicle design. For reasons of space and alignment difficulties, it can be challenging to provide additional illumination elements on the exterior of a vehicle. The task of the invention is therefore to extend a vehicle exterior system in such a way that additional illumination elements can be integrated into a vehicle exterior system without the need for alignment to an existing lamp.

This object is achieved by a vehicle exterior system of the above-mentioned kind, wherein the vehicle exterior system further comprises a seal, which is in contact with and positioned between the bracket and the bumper, such that a closed seal path is created between the bracket and the bumper, wherein the bracket is designed to form an enclosure, which is enclosed by at least the inner surface of the bumper, the front surface of the bracket and the seal between the bracket and the bumper, wherein the bumper comprises at least one transparent section, which connects the outer surface and the inner surface such that light is transmittable through the transparent section, wherein at least one illumination element is arranged in the enclosure and configured to emit light, which is transmittable through the transparent section.

In order to allow an easy and secure assembly it can be advantageous when the bracket is mechanically connected to the bumper by first fastening means, which first fastening means provide a clamping force between the bracket, the bumper and the seal in between.

A very fast assembly can be achieved, when the bracket is formed in one piece with the seal.

The bracket is preferably aligned to the lamp by aligning elements formed on the cover lens and further mechanically connected to the lamp by second fastening means, which engage into the housing.

A very compact solution is possible when the electronic elements are arranged in the enclosure, which electronic elements are held by the bracket and configured to provide an electronic power supply for the illumination element.

The invention is explained in more detail below with reference to exemplary embodiments illustrated in drawings, which show in FIG. 1 a front view of the vehicle exterior system and FIG. 2 a cross-sectional view of the vehicle exterior system.

In the following figures identical reference signs refer to identical features unless expressly depicted otherwise. The reference signs are only for informational purpose and do not limit the scope of protection.

The directional terms for a surface or component may refer to the orientation of the vehicle in its initial position. The vehicle includes the described exterior system 1. Although these terms may suggest an orientation toward or away from a specific area, they indicate only the general facing direction of the surface. This means the surface may not directly face the area but is oriented toward it, potentially with intervening elements. Although the embodiment shown illustrates the front of a vehicle, it is clear that other parts of the vehicle can also comprise such an exterior system.

FIG. 1 shows a part of a vehicle exterior system 1. The vehicle exterior system 1 comprises a first exterior section 3 and a second exterior section 11 which are adjacent to each other.

The first exterior section 3 is formed by an outer surface 4 of a bumper 2. The first exterior section 3 and the second exterior section 11 can therefore be seen as parts of the outer skin of a vehicle.

The second exterior section 11 is formed by a first outer lens section 10 of a cover lens 8. The cover lens 8 is part of a lamp 7.

The bumper 2 comprises transparent sections 6, which are transparent to light 23.

Figure 2:
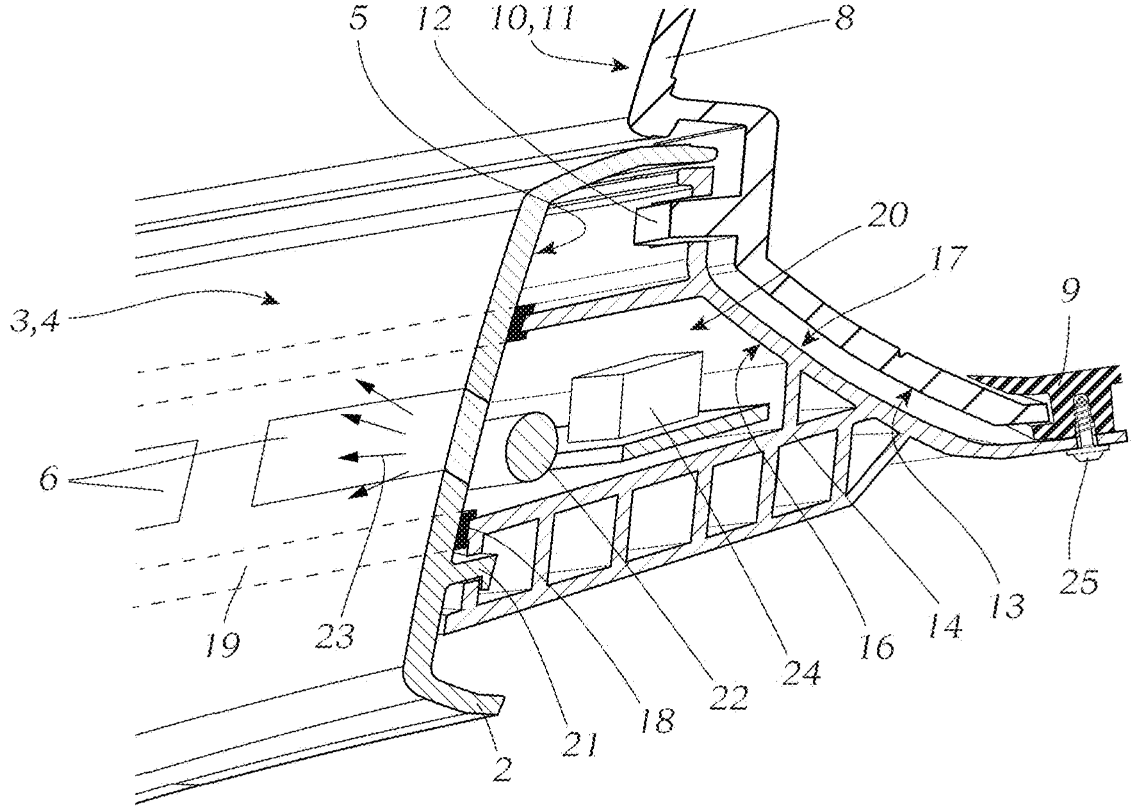

FIG. 2 shows a cross-section along the A-A line in FIG. 1. For clarity, only a detailed section of FIG. 1 is shown in FIG. 2, highlighted by the dashed square in FIG. 1.

The cross-section of FIG. 2 shows that the vehicle exterior system 1 comprises a rigid bracket 14 additional to the bumper 2 and the lamp 7.

The bumper 2 comprises the outer surface 4 and an inner surface 5 opposite to the outer surface 4, the outer surface 4 forms as indicated in FIG. 1 the first exterior section 3 of the vehicle exterior system 1.

The lamp 7 comprises a housing 9 additional to the cover lens 8. The housing 9 and the cover lens 8 together form a space that can accommodate lighting elements, for example, in the form of a headlamp unit. The lighting elements are not shown but may provide lighting functions such as signal light, high beam, or low beam. The housing 9 usually does not form an exterior section of the vehicle.

The cover lens 8 comprises additionally to the first outer lens section 10 a second outer lens section 13 which overlaps with the bumper 2 such that the inner surface 5 of the bumper is partly directed to the second outer lens section 13 of the cover lens and such that the first exterior section 3 of the vehicle exterior system 1 and the second exterior section 11 of the vehicle exterior system 1 are adjacent to each other. This means that the cover lens 8 forms only partly an exterior section of the vehicle. The first outer lens section 10 is typically made from a transparent material. The second outer lens section 13 may comprise a non-transparent material.

The rigid bracket 14 comprises a front surface 16 and a rear surface 17 opposite to the front surface 16. The bracket 14 is positioned between the lamp 7 and the bumper 2 such that the front surface 16 of the bracket 14 faces partly the inner surface 5 of the bumper 2 and the rear surface 17 of the bracket 14 faces partly the second outer lens section 13. The rigid bracket 14 may be made from a plastic material like TP thermoplastic polyurethanes.

The vehicle exterior system 1 further comprises a seal 18. The seal 18 is in contact with and positioned between the bracket 14 and the bumper 4 such that a closed seal path 19 is created between the bracket 14 and the bumper 2. The seal 18 can be made from materials such as foam, EPDM ethylene-propylene diene monomer, TP thermoplastic polyurethanes, or silicone, providing durability and resistance to environmental influences. The seal 18 can be an individual part that is assembled between the bracket 14 and the bumper 4 but preferably the seal 18 is formed in one piece with the bracket 14. This can be achieved by well-known two component injection molding processes.

The bracket 14 is designed to form an enclosure 20, which is enclosed by at least the inner surface 5 of the bumper 2, the front surface 16 of the bracket 14 and the seal 18 between the bracket 14 and the bumper 2. Therefore, the closed seal path 19 may extend over a path along the inner surface 5 of the bumper 2 in a closed loop such that the enclosure 20 is sealed at least in the area where the inner surface 5 of the bumper 2 is connected to the front surface 16 of the bracket 14 via the seal 18.

It is clear that the enclosure 20 does not necessarily have to be a hermetically sealed boundary. The person skilled in the art is familiar with measures-such as ventilation elements-which can create an atmospheric connection from the enclosure 20 to the outside.

The bracket 14 can be fixed to any part of the vehicle or the vehicle exterior system 1 but is preferably, as shown, mechanically connected to the bumper 2 by first fastening means 21 which may be formed as clips. These first fastening means 21 can thus provide a clamping force between the bracket 14, the bumper 2 and the seal 18 in between.

Moreover, the bracket 14 may be aligned to the lamp 7 by aligning elements 12. Such aligning elements 12 can be formed on the cover lens 8. In such a case the bracket 14 is preferably additionally mechanically connected to the lamp 7 by second fastening means 25. The second fastening means 25 may be screws or rivets, which engage into the housing 9 of the lamp 7.

The bumper 2 further comprises transparent sections 6. The transparent sections 6 connect the outer surface 4 and the inner surface 5 such that light 23 is transmittable through the transparent sections 6. The bumper 2 may be made from a completely non-transparent material, with transparent sections 6 formed from a transparent material and integrated into the bumper 2. The bumper 2 could be manufactured using a two-component injection molding process, combining both non-transparent and transparent materials. Alternatively, the bumper may comprise a transparent layer beneath a non-transparent layer, with openings in the non-transparent layer to form the transparent sections 6. The transparent sections 6 may also be formed by laser-cutting the non-transparent layer in designated areas to reveal the transparent material and form thereby transparent sections 6. In any case it is important that the bumper 6 comprises transparent sections 6 through which light 23 is transmittable.

At least one illumination element 22 is arranged in the enclosure 20. The fixation of the illumination element 22 can be achieved through an appropriately designed seal 18. Alternatively or additionally, fixation may be accomplished by using connecting means such as clips, screws, or hot staking to the bracket 14. The illumination element 22 is configured to emit light 23, which is transmittable through the transparent sections 6. The illumination element 22 may comprise at least one light emitting diode or alternative light sources and optical parts like light guides with outcoupling structures. The illumination element 22 can be attached to the bracket by screws or clips. Further illumination elements are possible and may differ from the one illumination element 22.

As shown, the vehicle exterior system 1 may further comprise electronic elements 24. Such electronic elements

24 may be driving circuits placed on printed circuit boards, which are held by the bracket 14. The electronic elements 24 can be arranged in the enclosure 20 and may be configured to provide an electronic power supply for the at least one illumination element 22.

The invention is not limited to the embodiments shown but is defined by the entire scope of protection of the claims. Individual aspects of the invention or of the embodiments can also be taken up and combined with one another. Any reference signs in the claims are exemplary and serve only the purpose to allow easier review without restricting the claims.

The invention claimed is:

1. A vehicle exterior system (1) comprising:

a bumper (2);

a lamp (7); and a rigid bracket (14), wherein the bumper (2) comprises an outer surface (4) and an inner surface (5) opposite to the outer surface (4), the outer surface (4) forming a first exterior section (3) of the vehicle exterior system (1), wherein the lamp (7) comprises a cover lens (8) and a housing (9), the cover lens (8) comprising a first outer lens section (10) which forms a second exterior section (11) of the vehicle exterior system (1), the cover lens (10) further comprising a second outer lens section (13) which overlaps with the bumper (2) such that the inner surface (5) is partly directed to the second outer lens section (13) and such that the first exterior section (3) and the second exterior section (11) are adjacent to each other, wherein the bracket (14) comprises a front surface (16) and a rear surface (17) opposite to the front surface (16), the bracket (14) being positioned between the lamp (7) and the bumper (2) such that the front surface (16) faces partly the inner surface (5) and the rear surface (17) faces partly the second outer lens section (13), wherein the vehicle exterior system (1) further comprises:

a seal (18), which is in contact with and positioned between the bracket (14) and the bumper (2), such that a closed seal path (19) is created between the bracket (14) and the bumper (2), wherein the bracket (14) is designed to form an enclosure (20), which is enclosed by at least the inner surface (5) of the bumper (2), the front surface (16) of the bracket (14) and the seal (18) between the bracket (14) and the bumper (2), wherein the bumper (2) is formed of a non-transparent material and comprises at least one transparent section (6) bounded by and directly connected to the non-transparent material, the transparent section (6) connecting the outer surface (4) and the inner surface (5) such that light is transmittable through the transparent section (6), and wherein at least one illumination element (22) is arranged in the enclosure (20) and configured to emit light (23), which is transmittable through the at least one transparent section (6).

2. The vehicle exterior system (1) according to claim 1, wherein the bracket (14) is mechanically connected to the bumper (2) by a first fastening means (21), which provides a clamping force between the bracket (14), the bumper (2), and the seal (18) therebetween.

3. The vehicle exterior system (1) according to claim 1, wherein the bracket (14) is formed in one piece with the seal (18).

4. The vehicle exterior system (1) according to claim 1, wherein the bracket (14) is aligned to the lamp (7) by aligning elements (12) formed on the cover lens (8) and wherein the bracket (14) is further mechanically connected to the lamp (7) by a second fastening means (25), which engages into the housing (9).

5. The vehicle exterior system (1) according to claim 1, wherein electronic elements (24) are arranged in the enclosure (20), the electronic elements (24) being held by the bracket (14) and configured to provide an electronic power supply for the illumination element (22).

* * * * *